US008398796B2

(12) United States Patent
Kuenzler et al.

(10) Patent No.: US 8,398,796 B2
(45) Date of Patent: Mar. 19, 2013

(54) GREEN JOINING CERAMICS

(75) Inventors: Glenn H. Kuenzler, Beachwood, OH (US); Thomas J. Boyle, Lyndhurst, OH (US); Michael Vincent Yee, Gates Mills, OH (US); Brian Danison, Munson Township, OH (US)

(73) Assignee: General Electric Company, Schenectady, NY (US)

( * ) Notice: Subject to any disclaimer, the term of this patent is extended or adjusted under 35 U.S.C. 154(b) by 1086 days.

(21) Appl. No.: 11/942,857

(22) Filed: Nov. 20, 2007

(65) Prior Publication Data
US 2009/0130459 A1 May 21, 2009

(51) Int. Cl.
C03B 29/00 (2006.01)
B29C 65/00 (2006.01)
B32B 9/04 (2006.01)
H01J 11/00 (2012.01)

(52) U.S. Cl. ....... 156/89.11; 156/60; 428/446; 264/671; 264/632; 264/642

(58) Field of Classification Search ............ 156/60, 156/73.1, 73.6, 83, 89.11, 196, 244.13, 292, 156/304.2, 304.5, 309.9, 296, 85; 313/570, 313/623, 25, 634, 113, 318.09; 269/50
See application file for complete search history.

(56) References Cited

U.S. PATENT DOCUMENTS

| 3,564,328 A | 2/1971 | Bagley et al. |
| 4,707,583 A * | 11/1987 | Kim et al. ............. 219/121.36 |
| 4,853,053 A | 8/1989 | Minjolle et al. |
| 5,994,839 A | 11/1999 | Yamamoto et al. |
| 6,346,495 B1 | 2/2002 | Dynys et al. |
| 6,592,695 B1 * | 7/2003 | Polis et al. ................. 156/89.11 |
| 6,620,272 B2 | 9/2003 | Zaslavsky et al. |
| 6,679,961 B2 | 1/2004 | Dynys et al. |
| 2002/0117249 A1 * | 8/2002 | Zaslavsky et al. ......... 156/89.11 |
| 2002/0187303 A1 * | 12/2002 | Kato et al. .................... 428/116 |
| 2005/0215167 A1 | 9/2005 | Neil et al. |

FOREIGN PATENT DOCUMENTS

| EP | 0 232 048 B1 | 8/1987 |
| EP | 0 786 797 81 | 7/1997 |
| EP | 0 827 177 B1 | 3/1998 |
| EP | 1 089 321 A1 | 4/2001 |
| EP | 1089321 A1 * | 4/2001 |
| EP | 1 612 841 A2 | 1/2006 |
| WO | WO 02/50857 A2 | 6/2002 |

OTHER PUBLICATIONS

PCT/US2008/075936 International Search Report, mailed Nov. 5, 2008.

* cited by examiner

Primary Examiner — Philip Tucker
Assistant Examiner — Alex Efta
(74) Attorney, Agent, or Firm — Fay Sharpe LLP

(57) ABSTRACT

A method of green joining ceramic components is disclosed, particularly for use in forming a discharge body for a ceramic metal halide lamp. The process includes providing a first green ceramic component having a male joining surface, and providing a second green ceramic component having a female joining surface dimensioned to matingly receive the first component. The first and second green ceramic components are assembled along the joining surfaces, the assembled components are uniformly heated to join the first and second components. The joined components are next cooled in a cooling bath that uniformly cools the joined components. Thereafter, the joined green part may be inserted in the furnace for debindering and sintering.

32 Claims, 4 Drawing Sheets

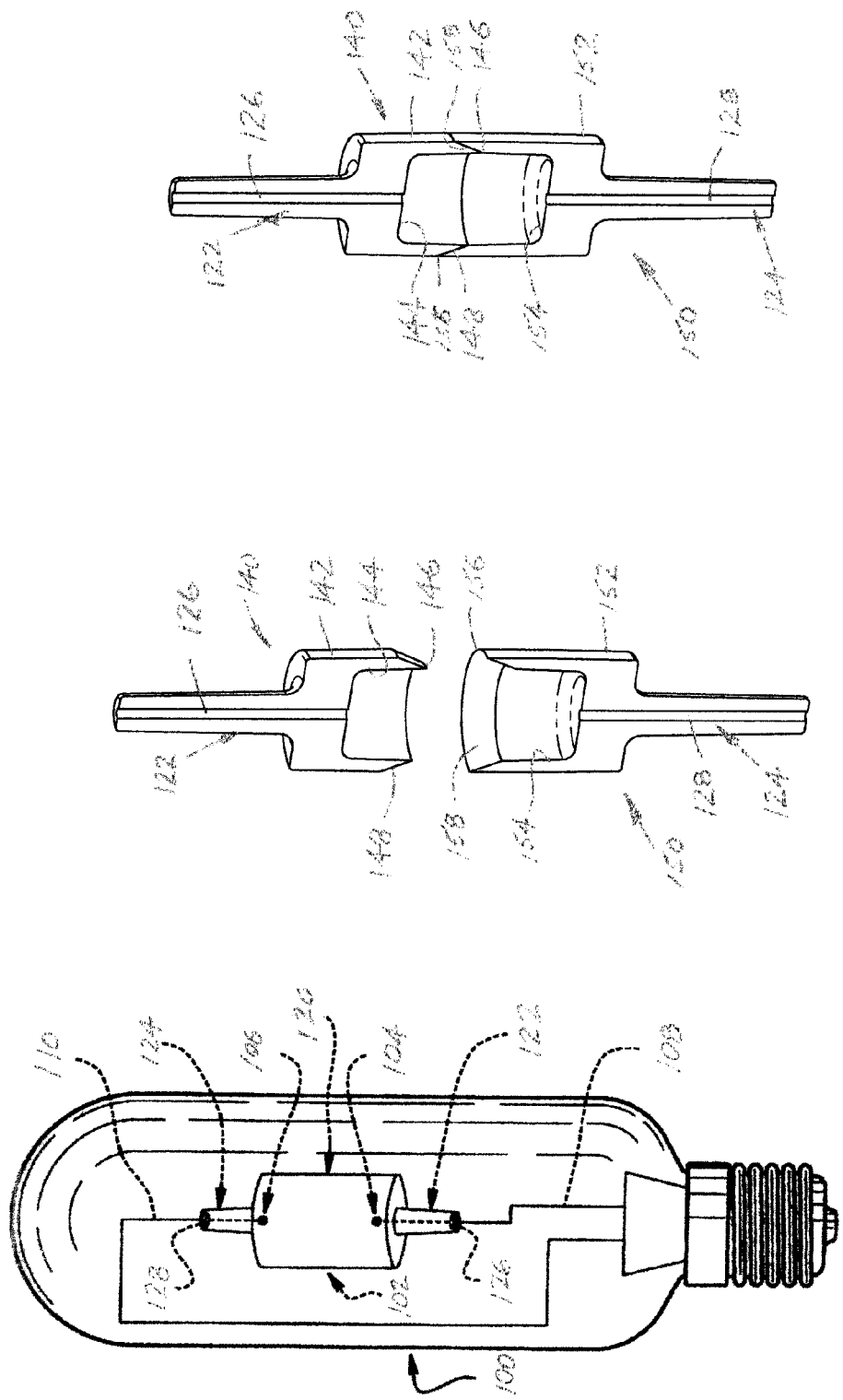

GREEN JOINING CERAMICS

BACKGROUND OF THE INVENTION

This disclosure relates to green joining of ceramic components, and more particularly, is directed to a method of joining green ceramic components of the type used in a high intensity discharge (HID) lamp application. However, this application should not be limited to that particular application and may find application and benefit in related environments and uses.

A need exists for a simple and inexpensive manner of bonding ceramic components together. It is known by way of other disclosures, to mechanically assemble the components or parts, then place the assembled components into a debindering furnace for removal of the wax, a typical binder, so that exposure over a preselected time and temperature causes the components to bond. A portion of these components experience what appear to be hoop-stress cracks extending generally parallel to an axis of the assembled components. These cracks appear to develop during the debindering cycle in the furnace, and it is believed that the cracks are caused at least in part from an interference fit and the resulting forces that are transferred from one component to the other. Thus, although the known process is successful in mechanically bonding the components together, any cracks are an undesired limitation in forming a hermetic bond between the components that is critical to lamp functionality. Thus, a need exists to bond or secure the components before debindering so that cracks do not form in the finished part.

Other approaches have been proposed in an effort to join the green components before debindering. For example, U.S. Pat. No. 6,620,272 describes a process for joining green ceramic components through localized heating. Specifically, the '272 patent describes a ceramic arc tube used in HID lamps comprised of a polycrystalline alumina ceramic. An alumina powder is mixed with a binder material such as a wax or thermoplastic, formed into a desired shape, e.g., by injection molding, and the binder material assists the molded alumina components in maintaining a desired shape while in a green state. As is known, the binder is then removed when the components are fired. The resultant arc tube advantageously withstands high stress, temperature, and corrosive chemicals associated with the arc tube environment.

The '272 patent suggests that heat be applied to joining surfaces so that a localized melting occurs at that region. Exemplary methods of localized heating include heated gas or forced hot air, an infrared laser, an incandescent lamp, or an incandescent resistive element applied to the joining surfaces. In addition, after heating, the '272 patent then subjects one or both components to compression and stretching, where compression urges the components toward one another and past any initial point of contact. This compression results in a radially outward extending bulge being formed at a visible seam between the joined components. The patent description states that the bulge is then reduced by subsequent stretching. This compression and stretching may occur multiple times, and even though the completed arc tube allegedly achieves desired performance characteristics, a visible seam remains after sintering.

Excessive handling of bonded green components result in cracks and/or undesirably subject the joined component to forces and stresses that may lead to cracks in the final part. Thus, a need exists for a simple, inexpensive, quick-acting, commercially adaptable, and highly effective process for joining green ceramic components and particularly a process that reduces the cracks in the final parts, and preferably does not have a visible parting line or seam.

SUMMARY OF THE INVENTION

A method for bonding molded ceramic components in their green state without causing undesired cracking at the joint is disclosed.

A preferred method comprises providing a first green ceramic component having a male joining surface, and providing a second green ceramic component having a female joining surface dimensioned to matingly receive the first component. The first and second components are assembled along the joining surfaces, and the assembled components uniformly heated to join the first and second components.

A preferred manner of uniformly heating the assembled components involves immersing the assembled components in a heated bath.

After the components are removed from the heated bath, the assembled components are then uniformly cooled, one preferred manner of uniformly cooling including immersing the components in a cooling bath.

Preferably, water is used as the heated bath.

Quickly bonding the components to one another and cooling the bond quickly is important so that the individual components do not change shape while at an elevated temperature where the components are softer.

On the other hand, the components are preferably not cooled too quickly, i.e., quenched, since quenching may temperature shock the material and develop cracks.

A preferred range for the hot bath immersion to achieve binding is between approximately 75° and 90° C. The cooling bath is preferably room temperature or above, e.g., the cooling bath has a preferred temperature between approximately 25° and 35° C.

Preferably the components have mating shapes, that is male and female components, so that intimate contact occurs between the first and second components.

In a preferred arrangement, the shapes of the ceramic components are self-centering.

The components may be inserted into the respective baths or it may be desirable to keep the assembled parts stationary while bringing the immersion bath to the parts.

The resultant body or final part from bonding two or more components together in this manner is the only way presently known for the resultant product to have no visible parting line.

The manufacturing process is substantially simplified. Both the total time and number of steps are reduced.

The process is not limited to cylindrical shapes or hollow tubing and thus advantageously expands the possibility for a wide range of designs and complex geometries that cannot be molded as single pieces.

The process is also attractive because it is inexpensive, uses relatively safe materials (water), and can be performed in high volume.

The dimensional accuracy of the finished parts and the repeatability of the process also appear to be superior to other approaches.

Still other features and benefits of the present disclosure will become apparent to those skilled in the art upon reading and understanding the following detailed description.

BRIEF DESCRIPTION OF THE DRAWINGS

FIG. 1 shows a light source having a ceramic discharge chamber of the type to which the present disclosure pertains.

FIG. 2 is a longitudinal cross-sectional view of first and second components or parts that are separately molded.

FIG. 3 illustrates the first and second components brought into contact or abutment, and assembled together.

DETAILED DESCRIPTION OF THE INVENTION

Figure 6:
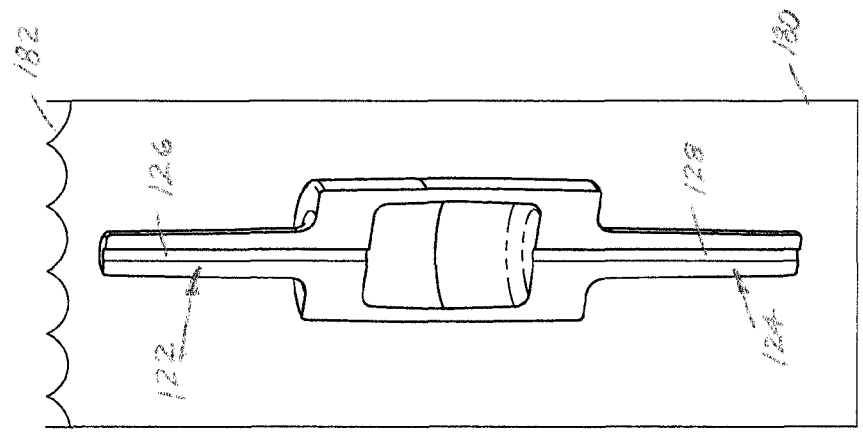
FIG. 6 illustrates insertion of the assembled component of FIG. 5 into a cooling bath.

A standard construction for ceramic metal halide (CMH) lamps includes a three-piece ceramic component where an extruded body tube is capped on either end by an injection-molded part. A required hermetic seal is obtained between the molded leg portions and the central tubular portion, particularly when debindering and sintering have been completed. For example, the arc tube preferably comprises alumina ($Al_2O_3$) having a purity of about 99.98% and a surface area of about 2-10 $m^2/g$ before sintering. The alumina powder can be doped with magnesia to inhibit grain growth, for example in an amount equal to about 0.03-0.2%, preferably about 0.05% by weight of the alumina. Other ceramic materials which may be used include non-reactive refractory oxides and oxynitrides, such as yttrium oxide, lutetium oxide, and hafnium oxide, and their solid solutions and compounds with alumina, such as yttrium-aluminum-garnet and alumina oxynitride. Binders which may be used individually or in combination include organic polymers, such as polyols, polyvinyl alcohol, vinyl acetates, acrylates, cellulosics, and polyesters. It will be appreciated, however, that these are representative materials only and the present disclosure should not be limited to the materials or value ranges.

Shown in FIG. 1 is a representative discharge lamp 100 that has a discharge chamber 102 containing first and second electrodes 104, 106 and a fill material. The electrodes are connected to conductors 108, 110 so that an electric potential difference is applied across the electrodes. In operation, and as is well known in the ceramic metal halide (CMH) art, the electrodes 104, 106 produce an arc which ionizes the fill material to produce a plasma in the discharge chamber 102. Emission characteristics of the light produced by the plasma depend, for example, on the constituents of the fill material, the voltage across the electrodes, the temperature distribution in the chamber, the pressure in the chamber, and the geometry of the chamber. For a CMH lamp, the fill may typically comprise a mixture of mercury (Hg), a rare gas such as argon or xenon (Ar and Xe), and a metal halide such as NaI, TiI, $DyI_3$. For high pressure sodium lamps, the fill material typically comprises sodium (Na), a rare gas, and mercury (Hg). Other fill materials are also well known in the art, and the present invention is believed to be suitable for operation with any of these recognized ionizable materials.

The discharge chamber includes a central body portion 120 and first and second leg portions 122, 124, shown here as extending from axially opposite ends of the central body portion. Each electrode is connected to one of the conductors which is received within a respective bore 126, 128 formed through the respective leg portions 122, 124. Typically, the electrodes 104, 106 are tungsten and the conductors comprise niobium and molybdenum which advantageously has thermal expansion coefficients close to that of alumina in an effort to reduce thermally induced stresses on the alumina leg portions. The body portion 120 of the discharge chamber is typically substantially cylindrical. Exemplary dimensions are set forth in commonly-owned U.S. Pat. No. 6,346,495, the disclosure of which is incorporated herein by reference, although these are only examples and it will be understood that still other lamp arrangements (e.g., non-cylindrical) are contemplated as falling within the scope and intent of this disclosure.

FIG. 2 illustrates the first and second components in spaced relation, and represent that the components may be separately molded, for example through an injection molding or die pressing operation, or other suitable forming technique known in the art. First component 140 includes the leg portion 122 having bore 126 therethrough that communicates with an enlarged, partial cylindrical portion 142 at one end, and particularly a recessed portion 144 extending inwardly from a terminal end 146 of the first component. As will be appreciated, when fired, the leg of the component forms the leg 122 of the discharge lamp while cylindrical portion 142 forms a portion 120a of the central body portion 120 of the discharge light source 100. This first component 140, which will also be referred to as a first green ceramic component, includes a joining surface, particularly a male joining surface 148. In this first preferred arrangement, the male joining surface 148 is a conical region or taper that is precisely dimensioned, although other male geometries may be used without departing from the scope and intent of the present disclosure. Preferably, the geometry is a smoothly contoured, continuous surface that extends over the entire joining surface, i.e., from the interior surface or inner diameter to the exterior surface or outer diameter.

A second green ceramic component 150 similarly has a hollow cylindrical portion or leg 124 with a bore 128 therethrough that communicates from one end of the second component to an enlarged, partial cylindrical portion 152 at the other end, and particularly with a recess 154 in the partial cylindrical portion extending axially inward from the opposite terminal end 156. The second green ceramic component has a joining surface, specifically a female joining surface 158 which in this embodiment assumes the geometry of a female taper or conical surface for matingly receiving the first component 140. Again, the geometry of the female surface is preferably a smoothly contoured, continuous surface that extends over the entire joining surface, i.e., from the interior surface or inner diameter to the exterior surface or outer diameter. The molded components 140, 150 are dimensionally precise so that when the components are fitted together as illustrated in FIG. 3, the first component is received partially within the second component, i.e., the male and female joining surfaces align and mate with one another. Stated another way, when assembled as shown in FIG. 3, the first and second green ceramic components 140, 150 mate along the joining surfaces 148, 158.

The conical geometry of the male and female joining surfaces is desired because it is self-centering. It will be appreciated, however, that still other geometrical surfaces may be used, and preferably cooperating male and female joining surfaces are used to provide for ease of assembly and preferably may incorporate an aligning function also.

It will be appreciated that each of the first and second components 140, 150 is formed or molded separately. That is, multiple components (both male and female depending on the mold cavities) may be formed in the same mold at the same time, and thus molded from the same material and under the same molding conditions or parameters. Thus, the geometry may be different in the first and second components, but otherwise the components are generally formed of the same material and under similar conditions. As shown in FIG. 3, these components are then brought into intimate contact, or abutting relation. By orienting the first and second components in a vertical fashion, the self-centering feature of the cooperating conical joining surfaces 148, 158 is advantageously employed to self-center and align the components for the green binding. Preferably, the components are not forced together or twisted into cooperative relation, and likewise no interference fit between the components is desired but rather the first component is simply set into abutting relation with the second component. Likewise, due to the male and female mating relationship of the two components, it does not matter which component is up and which one is down.

As noted above, each of the first and second components is preferably an alumina oxide powder mixed with a wax, where the wax serves as the binder. Thus, when the component is heated, the wax melts and wicks out or evaporates. To completely remove the wax, the components are put into a furnace that slowly raises the temperature and the wax turns to liquid and evaporates away, thus leaving the desired powder component in a desired shape. However, it is believed that during this furnace process, the material of the components may be subjected to a fairly weakened state and the weight of one part on the other may sometimes result in a wedging action that may have contributed to cracks in the final assembled body. That is, the first and second components may slide one over the other before the green binding occurs. Consequently, having the components bind together without the wedging or relative excessive sliding of one component over the other before the assembled component is placed in a furnace was found to eliminate the cracking.

Figure 4:
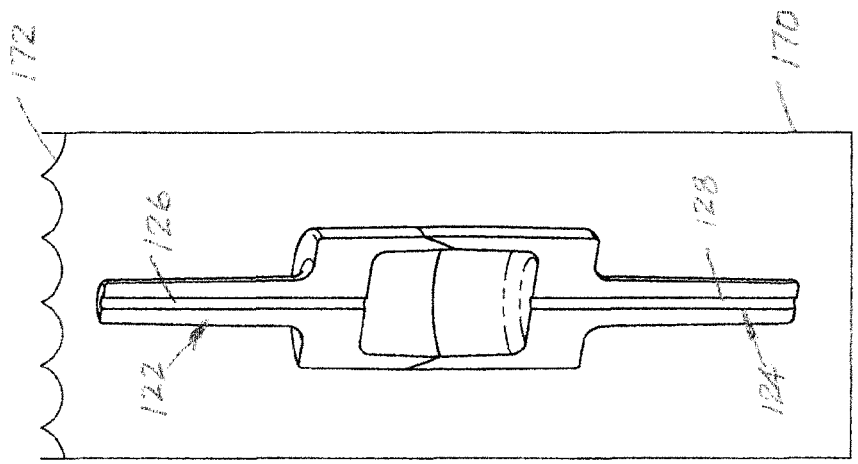
FIG. 4 is a view similar to FIG. 3 and illustrating uniform heating of the assembled components to join the first and second components together.

The assembled components of FIG. 3 are subjected to a uniform heating, and preferably uniform heating of the entirety of the assembled components to join the first and second components together before the assembled component is inserted into a furnace for debindering and firing. Thus, as shown in FIG. 4, one preferred manner of uniformly heating the entire assembled components is to immerse the assembled components in a heated bath 170. Here, the heated bath 170 of FIG. 4 is preferably hot water 172 because water is a good heat transfer medium, inexpensive to use in a commercial environment, and a relatively safe material that also allows the processing to occur in high volume. Of course, it will be recognized that other liquids may be used, however, the other liquids could add undesired complexities to the manufacturing process. Particularly, the assembled first and second components of FIG. 3 are preferably immersed or totally inserted into the heated bath (FIG. 4). A preferred temperature range is between approximately 75 to 90° C. and the assembled components are immersed in the hot bath for a short period of time, for example on the order of ten (10) to twenty (20) seconds. The assembled components are heated relatively quickly, and more importantly, the components bond together in their relative assembled positions before the components have an opportunity to adversely move (wedge or excessively slide relative to one another from the contact relationship of FIG. 3).

Figure 5:
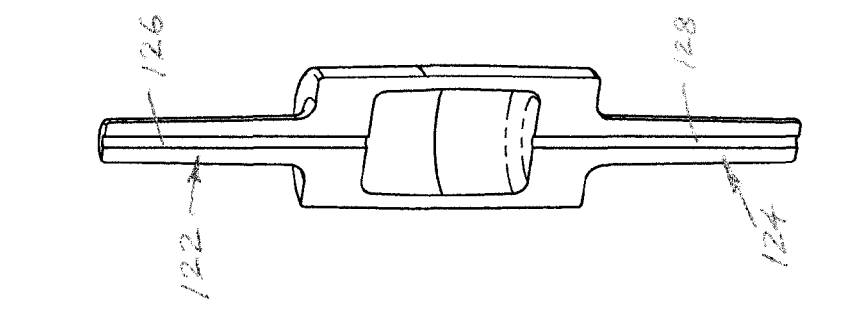
FIG. 5 illustrates the assembled components after they are removed from the bath of FIG. 4.
Figure 7:
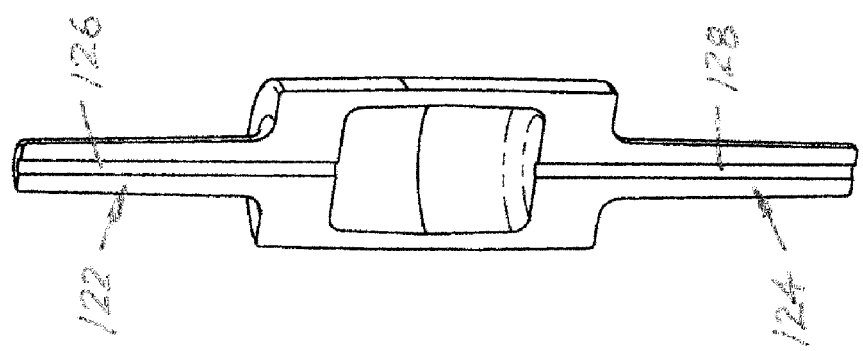
FIG. 7 shows an elevational view of the assembled components once removed from the bath of FIG. 6.

Next, and as represented in FIG. 5, the assembled components are removed from the hot bath. It will be appreciated that the components have bonded at the interface in the short period of time immersed in the hot bath. Just as importantly, however, is the insertion of the assembled, bonded components into a cooling bath 180 (FIG. 6). Again, preferably the entirety of the assembled components are uniformly cooled. Once again, water 182 is a preferred cooling bath and the cooling bath temperature may range from approximately room temperature or slightly above. That is, a preferred temperature range of the cooling bath is approximately 25° to 35° C., although this range may vary depending on the particular wax formulation being used. Likewise, the time in the cooling bath may vary but can be for approximately ten seconds or more, with no practical upper end to the range. The cooling bath hardens the bonded components together and as a result, the parts are advantageously bonded before debindering. Subsequently, the assembled components are debindered and then the bonded components proceed through a firing process as is well known in the art. The resultant products or parts of FIG. 7 show that the parting line at the interface between the assembled first and second components is essentially eliminated (note the cross-section). Likewise, the issue with cracks developing in the final parts is also advantageously overcome with this green joining process.

Initial testing also demonstrates that the strength of this bond as green components is not significantly different than the strength of the molded parts themselves. That is, as a result of the firing process in the furnace that converts the joined components to a finished part, the body becomes harder and converts to a ceramic. Although it may be expected that the final part would be expected to break at the joint in the finished product, initial testing indicates that this is not the case. Instead, the legs are actually weaker than the bond region and would appear to indicate that the bond region acts as if the assembled components were one part. Subsequent examination of the finished part illustrates that the parting line or parting surface has essentially vanished. That is, after the hot/cooling water treatment, there is no separate component 140 and component 150, rather there are green bonded components even though a line is shown in FIG. 7, for example, to demonstrate there were initially two components.

It will also be appreciated that it is not as desirable to allow the assembled components to cool of their own accord after removal from the hot water. Allowing an extended period of time to cool undesirably provides sufficient time at an elevated temperature in which the components may be permitted to deform (e.g., wedge, or adversely slide past one another from their respective initial contact positions of FIG. 3). Thus, the cooling bath contributes to the hardening of the green joined components. The advantage is that the assembled components are quickly bonded before the components change shape. While at an elevated temperature, the components are soft. However, at room temperature the joined components can be handled.

The joined components can also be cooled too quickly. That is, if quenched, thermal stresses contribute to the development of cracks in the fired part. Thus, it is preferred to cool the green joined components but not quench the part as quenching may contribute to shocking of the material.

Figure 8:
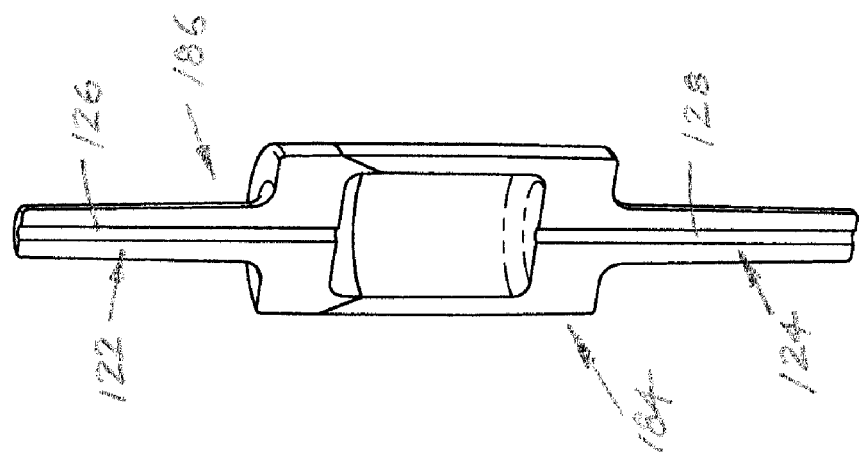
FIG. 8 shows an asymmetric arrangement of joining surfaces provided on the first and second components.

FIG. 8 illustrates that other male and female conformations may be used, and further, that the conformations need not necessarily be symmetrical. Thus, asymmetrical male and female components 184, 186 are shown in FIG. 8 in assembled relation. Preferably, any male and female arrangement that allows the components to come into close or intimate contact can be used.

Figure 9:
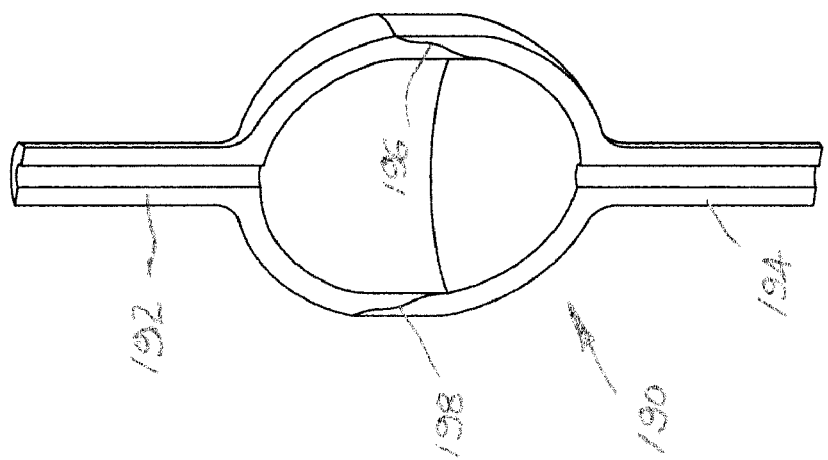
FIG. 9 is a cross-sectional view of first and second components that form an ellipsoidal shape when assembled.

FIG. 9 also illustrates that the components are not limited to the conventional cylindrical shapes. That is, the central body portion may be an ellipsoid 190 or still other desired configuration, and may include a variety of shapes that accommodate different types of ceramic components or lamp configurations. One skilled in the art will appreciate that as long as the first and second components can be abutted together, the commercial manufacture of more complex shapes can be achieved while still allowing for bonding between two molded ceramic components in their green state. It will also be appreciated that these figures indicate that the joined ceramic components need not necessarily be used to only form a discharge lamp of the type shown in FIG. 1, but may be used in a wide variety of lamps having for example a first leg 192 that extends axially outward and a second leg 194 that extends axially outward from the discharge space. Still other end uses requiring the effective joining of green ceramic components is thus contemplated.

Figure 11:
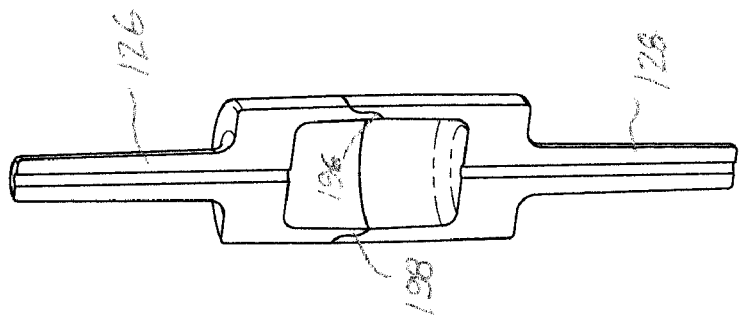
FIGS. 10 and 11 illustrate a modified profile of the joining surfaces of the first and second green ceramic components.
Figure 10:
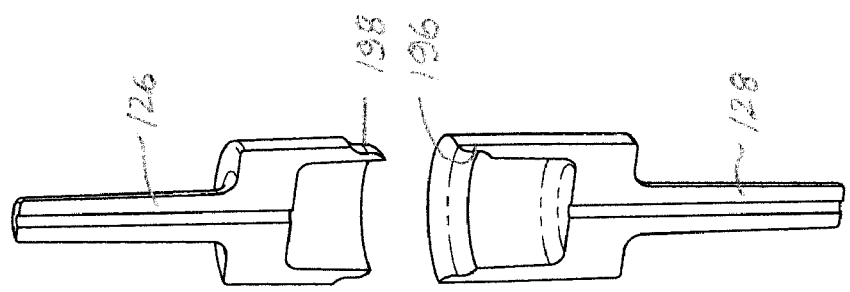

FIGS. 9, 10 and 11 demostrate that still other designs of the interface or joining surfaces may be used. Shown here is what is referred to as a curved line or an S-shape comprised of joining surfaces 196, 198. The mating conformation of these joining surfaces provides for desired alignment of the components. These joining surfaces are preferably a continuous, smooth contour that extends over the entirety of the joining surface to permit abutment therebetween without any discontinuities or interference fit that could adversely result in forces that may lead to cracking in the final joined components.

In summary, a viable method for bonding two molded ceramic components in their green state without causing commonly encountered problems of cracking at the joint is achieved. The first and second components are assembled together, and may have a joining area with a taper on the order of one degree and an interference fit of approximately 0.0016"i.e. essentially no intereference fit at all so that no deformation between the abutting components results. Preferably, preferred geometries such as conical mating surfaces are used. The assembly is carefully lowered into a heated water bath (or the heated water bath may be brought up over the assembly to limit movement of the assembled components). Because the wax binder system becomes soft and sticky at temperatures around 80° C., and because the immersion in the heated bath causes the material to reach this condition rapidly, the parts are bonded together before having the chance to slide and crack. Also, because the molded parts are very precise and the bonding approach described above acts quickly, the dimensional accuracy and repeatability is superior to other approaches.

After heating, the parts are immersed in a cool bath to harden the material again for transport to the debindering step. Successfully bonded parts necessary for a resultant hermetic seal are achieved in less than thirty (30) seconds. The process is inexpensive, uses relatively safe materials (hot and cool water), and can be performed in high volume. No interference in the mating parts is required, rather only close contact of the molded surfaces.

The process is also adaptable to high performance lamp designs, particularly CMH lamps. The present disclosure simplifies the manufacturing process by reducing the total time and number of steps. The process enables the construction of more complicated ceramic components that could not otherwise be molded as single pieces. The process might also be useful to a wide range of ceramic operations beyond just those in the lighting industry.

The invention has been described with reference to the preferred embodiments. Obviously, modifications and alterations will occur to others upon reading and understanding the preceding detailed description. For example, it is believed that another manner of uniformly heating the components is to use a different heated fluid such as steam to join the components. Likewise, it is believed that the fluid need not contact the interior of the components in order to create an effective uniform heating, rather the immersion into a liquid or application of a heated fluid has been found effective where only the external surfaces of the components are exposed, although the entire component is preferably uniformaly heated. Still another consideration that is apparent from FIG. 9 is that other non-cylindrical body shapes are contemplated without departing from the present invention. It is intended that the invention be construed as including all such modifications and alterations.

What is claimed is:

1. A method of green joining ceramic components comprising:
    providing a first green ceramic component having a male joining surface;
    providing a second green ceramic component having a female joining surface dimensioned to matingly receive the first component;
    assembling the first and second green ceramic components along the joining surfaces without causing an interference fit between the first and second components; and
    uniformly heating an entirety of the assembled components to join the first and second components, the uniformly heating step including immersing the assembled components in a heated bath to join the first and second components.

2. The method of claim 1 further comprising removing the assembled components from the heated bath after a predetermined period of time and immersing the assembled components in a cooling bath.

3. The method of claim 1 further comprising uniformly cooling an entirety of the assembled components after the heating step.

4. The method of claim 3 wherein the cooling step includes immersing the assembled components in a cooling bath.

5. The method of claim 4 further comprising using water as the cooling bath.

6. The method of claim 4 further comprising maintaining the cooling bath at a temperature of between approximately 25 to 35 degrees C.

7. The method of claim 1 wherein the uniform heating step includes applying a heated fluid to the entire external surface of the first and second components.

8. The method of claim 1 wherein the providing steps include molding the first and second components, respectively.

9. The method of claim 1 wherein the providing steps include forming the first and second components from the same material.

10. The method of claim 9 wherein the forming step includes adding a binder that has a melting point less than a temperature of the heated bath.

11. The method of claim 1 further comprising using water as the heated bath.

12. The method of claim 11 further comprising heating the heated bath between approximately 75-90 degrees C.

13. The method of claim 1 further comprising forming symmetrical joining surfaces.

14. The method of claim 1 further comprising forming asymmetrical joining surfaces.

15. A method of forming an envelope for a high intensity discharge lamp application, the method comprising:
    providing a first green ceramic component;
    providing a second green ceramic component, the first and second components having substantially S-shaped joining surfaces that mate with the other component;
    assembling the first and second green ceramic components along the substantially S-shaped joining surfaces;
    maintaining the first and second ceramic components in an abutting relation;

immersing the assembled components in a heated bath to join the first and second components while the first and second ceramic components are maintained in abutting relation; and firing the joined assembly.

16. The method of claim 15 further comprising maintaining the assembled components in the heated bath for approximately ten to twenty seconds.

17. The method of claim 16 further comprising heating the heated bath between approximately 75-90 degrees C.

18. The method of claim 15 further comprising maintaining the joined components in the cooling bath for approximately ten seconds.

19. The method of claim 18 further comprising maintaining the cooling bath at a temperature of between approximately 25 to 35 degrees C.

20. The method of claim 15 wherein the immersing steps including maintaining the assembled/joined components in a stationary position and positioning the heated/cooling bath thereover.

21. The method of claim 1 wherein the uniformly heating step includes maintaining the assembled components in a heated bath for approximately ten to twenty seconds.

22. The method of claim 21 further comprising heating the heated bath between approximately 75-90 degrees C.

23. The method of claim 21 further comprising immersing the joined components in a cooling bath for approximately ten seconds.

24. The method of claim 23 further comprising maintaining the cooling bath at a temperature of between approximately 25 to 35 degrees C.

25. The method of claim 23 wherein the immersing steps including maintaining the assembled/joined components in a stationary position and positioning the heated/cooling bath thereover.

26. The method of claim 1 wherein the joining surfaces have a generally S-shape.

27. The method of claim 1 wherein the uniformly heating step does not include localized heating.

28. The method of claim 1 wherein the joining surfaces are complementary, substantially S-shaped surfaces.

29. The method of claim 15 wherein the maintaining step does not include localized heating.

30. The method of claim 15 further comprising immersing the joined assembly into a cooling bath after the heated bath immersion.

31. The method of claim 15 wherein the maintaining step does not include providing an interference fit between the first and second components.

32. A method of green joining ceramic components comprising:

providing a first green ceramic component having a male joining surface;

providing a second green ceramic component having a female joining surface dimensioned to matingly receive the first component;

assembling the first and second green ceramic components along the joining surfaces;

immersing the assembled components in a heated bath to join the first and second components; and.

removing the assembled components from the heated bath after a predetermined period of time and immersing the assembled components in a cooling bath.

\* \* \* \* \*